United States Patent
Axelsson et al.

(10) Patent No.: US 8,891,463 B2
(45) Date of Patent: Nov. 18, 2014

(54) COMMUNICATIONS UNIT AND METHOD FOR USE IN A WIRELESS COMMUNICATIONS NETWORK

(75) Inventors: Samuel Axelsson, Stocksund (SE); Fredrik Ovesjö, Älvsjö (SE); Anders Jonsson, Täby (SE); Markus Ringström, Stockholm (SE)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 771 days.

(21) Appl. No.: 13/130,487

(22) PCT Filed: Dec. 18, 2008

(86) PCT No.: PCT/SE2008/051493
§ 371 (c)(1),
(2), (4) Date: May 20, 2011

(87) PCT Pub. No.: WO2010/071514
PCT Pub. Date: Jun. 24, 2010

(65) Prior Publication Data
US 2011/0228740 A1 Sep. 22, 2011

(51) Int. Cl.
*H04W 4/02* (2009.01)
*H04L 1/20* (2006.01)
*H04W 52/34* (2009.01)
*H04W 52/12* (2009.01)
*H04W 52/28* (2009.01)
*H04L 1/00* (2006.01)
*H04W 72/12* (2009.01)

(52) U.S. Cl.
CPC ............ *H04W 52/346* (2013.01); *H04W 52/12* (2013.01); *H04W 52/286* (2013.01); *H04L 1/20* (2013.01); *H04L 1/0033* (2013.01); *H04W 72/1231* (2013.01); *H04W 52/125* (2013.01)
USPC ............. 370/329; 370/318; 370/328; 455/69; 455/522

(58) Field of Classification Search
None
See application file for complete search history.

(56) References Cited

U.S. PATENT DOCUMENTS 6,385,462 B1 * 5/2002 Baum et al. ............... 455/522
6,865,393 B1 * 3/2005 Baum et al. ............... 455/452.2
(Continued)

FOREIGN PATENT DOCUMENTS

EP  1 793 509  6/2007
EP  1 811 799  7/2007
(Continued)

OTHER PUBLICATIONS

Japanese Office Action and English Summary, mailed May 7, 2013, in Japanese Application No. 2011-542040.
(Continued)

*Primary Examiner* — Hassan Phillips
*Assistant Examiner* — Saba Tsegaye
(74) *Attorney, Agent, or Firm* — Baker Botts, LLP

(57) ABSTRACT

A radio base station (1) for use in a wireless communication system comprises—a scheduling unit (9) arranged to schedule at least one user terminal to which to transmit in each subframe and—a power allocation unit (11) arranged to allocate a first amount of power to be used for the at least one user terminal in each subframe, a transmitter (5) arranged to transmit a transport block in a subframe to a number of user terminals (3) in the wireless communication system in accordance with said scheduling and power allocation. The radio base station further comprises—a correction unit (5) arranged to determine, after scheduling has been performed for a chosen subframe, if there is excess power in the chosen subframe that has not been allocated to any user terminal and if so allocate at least a first part of the excess power to at least one user terminal scheduled in the subframe. The excess power is used when transmitting in the subframe.

16 Claims, 3 Drawing Sheets

(56) References Cited

U.S. PATENT DOCUMENTS

| | | | |
|---|---|---|---|
| 8,031,648 B2 | 10/2011 | Ishii et al. | |
| 2007/0076723 A1* | 4/2007 | Chen | 370/395.4 |

FOREIGN PATENT DOCUMENTS

| | | |
|---|---|---|
| EP | 1 838 003 | 9/2007 |
| WO | WO 2006/041182 | 4/2006 |
| WO | WO 2006/065181 | 6/2006 |

OTHER PUBLICATIONS

International Search Report for PCT/SE2008/051493, mailed Nov. 18, 2009.

Written Opinion of the International Searching Authority for PCT/SE2008/051493, mailed Nov. 18, 2009.

Notification of International Preliminary Report on Patentability and Written Opinion of the International Searching Authority, Jun. 30, 2011, in corresponding Application No. PCT/SE2008/051493.

* cited by examiner

COMMUNICATIONS UNIT AND METHOD FOR USE IN A WIRELESS COMMUNICATIONS NETWORK

This application is the U.S. national phase of International Application No. PCT/SE2008/051493, filed 18 Dec. 2008, which designated the U.S., the entire content of which is hereby incorporated by reference.

TECHNICAL FIELD

The present invention relates to scheduling of user terminals in a wireless communications network. In particular, the invention relates to a radio base station and a method for power allocation in such a network.

BACKGROUND

When scheduling the High Speed Downlink Shared Channel (HS-DSCH) in a WCDMA system, a number of user terminals are selected to receive data from a radio base station in a transport block that is transmitted in a time interval known as a subframe. The scheduling is based, among other things, on the Channel Quality Indicator (CQI), signalled from the user terminals to the radio base stations. The CQI is used to determine a Transport Format Resource Combination (TFRC), which in turn specifies a Transport Block Size (TBS), a modulation method and a set of HS-PDSCH codes, as well as the required transmission power in order to achieve a certain target Block Error Rate (BLER) for the transmission. A typical target BLER is 10%.

If, for example, the user terminal is overestimating the channel quality, the experienced BLER will be higher than the target BLER, and vice versa. Erroneous estimation will result in offsets in the CQI signalled from the user terminal. In order to adjust for such offsets in the signalled CQI, a CQI adjustment function may be used. This function translates the received CQI to a channel quality measure, which in turn can be adjusted up or down to compensate for negative or positive bias. The CQI adjustment function is based on a comparison of the received ACK/NACK ratio, that is, the experienced BLER, to the target BLER, and the received CQI is adjusted before it is used to select a TFRC so that the experienced BLER matches the target BLER In some cases, in particular in low load scenarios, the target BLER may be achieved for all scheduled user terminals without using all the available power in the cell.

SUMMARY

It is therefore an object of the invention to enable more efficient use of the available power in a wireless communications network.

The invention relates to a communications unit for use in a wireless communication system, said communications unit comprising
  a scheduling unit arranged to schedule at least one user terminal to which to transmit in each subframe and
  a power allocation unit arranged to allocate a first amount of power to be used for transmission to the at least one user terminal in each subframe
  The communications unit further comprises
  a correction unit arranged to determine, after scheduling has been performed for a chosen subframe, if there is excess power in the chosen subframe that has not been allocated to any user terminal and if so allocate to the at least one user terminal scheduled in the subframe at least a first part of the excess power to be used in addition to the first amount of power for transmission to the at least one user terminal.

The invention also relates to a method in a wireless communication system, in which information is transmitted to a number of user terminals in subframes. According to an aspect of the invention, the method comprises the steps of
  scheduling at least one user terminal to which to transmit in a chosen subframe
  allocating a first amount of power to the at least one user terminal to be used when transmitting to the at least one user terminal,
  determining whether there is excess power in the subframe after scheduling,
  if there is excess power, allocating to the at least one user terminal scheduled in the subframe at least a first part of the excess power, to be used in addition to the first amount of power when transmitting to the user terminal, In one embodiment the communications unit also comprises a transmitter arranged to transmit the transport block in a subframe to a number of user terminals in the wireless communication system in accordance with said scheduling and power allocation. In this case, the transmitter is arranged to transmit the subframe using the first amount of power and the at least first part of the excess power. The transmitter may also be arranged in another unit in the network than the scheduling unit. The method preferably also comprises transmitting in the subframe using the first amount of power and the at least first part of the excess power.

The communications unit may be a radio base station according to the relevant standard.

Hence, when all selected user terminals have been scheduled for an upcoming subframe with a determined transmission power aiming at a certain target BLER, excess power in the cell may be applied to one or more of the scheduled user terminals. The excess power allocated will lower the experienced BLER of the user terminals that have excess power allocated to them, thereby increasing the peak rate for these user terminals. Excess power may be allocated to one or more user terminals scheduled in a particular subframe. The allocation may be made according to a number of different criteria, alone or in combination.

If the power is increased for a particular user terminal, that user terminal's experienced BLER will be reduced. The CQI adjustment function adjusts the received CQI by comparing the received ACK/NACK ratio, that is, the experienced BLER, to the target BLER and adjusts the received CQI so that the experienced BLER matches the target BLER. When extra power is allocated to a user terminal, in accordance with embodiments of this invention, this will reduce the experienced BLER for that user terminal. As a consequence the experienced BLER for this user terminal will be lower than it would have been without the extra power. This will be misinterpreted by the CQI adjustment function as the user terminal underestimating its radio conditions. This will lead to errors in scheduling, since the adjusted CQI will be based on a too low BLER, given a CQI adjustment algorithm based on e.g. the received ACK/NACK ratio.

In a preferred embodiment the effect of the altered BLER on the CQI is compensated for. In this embodiment, the communications unit further comprises a CQI adjustment unit for adjusting the CQI reported from the at least first user terminal in dependence of ACK/NACK signals received from the at least first user terminal. The CQI adjustment unit is arranged to adjust CQI taking into account ACK/NACK signals related to transport blocks in which no excess power was allocated to the at least first user terminal to a higher degree than ACK/

NACK signals related to trans-port blocks in which excess power was allocated to the at least first user terminal. The CQI adjustment may be performed based on only the ACK/NACK signals for the transport blocks in which no excess power was allocated to the at least first user terminal. Alternatively, the ACK/NACK signals may be weighted in such a way that the result will be predominantly based on the ACK/NACK signals related to trans-port blocks in which excess power was allocated. Hence the ACK/NACK signals related to transport blocks in which no excess power was allocated should be given a substantially higher weight in this case than the ACK/NACK signals related to transport blocks in which excess power was allocated. Preferably, the CQI adjustment unit is arranged to evaluate an experienced BLER based on all ACK/NACK signals from the at least first user terminal and a filtered BLER based predominantly on ACK/NACK signals related to transport blocks in which no excess power was allocated to the at least first user terminal.

This will improve the CQI adjustment that is generally performed in the communications unit, taking into account that the experienced BLER will deviate from the target BLER when excess power is applied.

In a preferred embodiment, the correction unit is arranged to determine whether excess power should be allocated to the at least one user based on the experienced BLER for the at least one user. This makes it possible to detect cases where the additional power does not lead to an experienced BLER within a certain acceptable range, and where it may be better not to allow the additional power and instead compensate the CQI downward. In one embodiment the acceptable range for the experienced BLER is based on the target BLER. In another embodiment the allowed range for the experienced BLER is based on the expected Block Error Probability, BLEP, which is in turn based on the used transmission power.

In one embodiment the experienced BLER is evaluated when a certain number of samples of ACK/NACKs have been collected and if the experienced BLER is not within the acceptable range extra power should not be allowed to be allocated to the user until the filtered BLER has been evaluated in the CQI adjustment function. If extra power is allocated the experienced BLER will be lowered, but if the experienced BLER is too low it may be beneficial to evaluate the CQI adjustment function since it can result in an adjustment upward of the received CQI enabling a larger TBS to be selected. If the largest possible TBS is already used the CQI adjustment is not needed.

The excess power may be distributed between the user terminals scheduled in the subframe according to different algorithms. For example, the correction unit may be arranged to allocate the at least first part of the excess power in dependence of a scheduling order set by the scheduling unit.

The excess power allocated to any given user terminal may be limited in absolute terms, or in relation to the power initially allocated to the user terminal. This is done because above a certain power level the improvement resulting from an increased power will be limited.

ACRONYMS AND ABBREVIATIONS

ACK Acknowledgement
BLEP Block Error Probability
BLER Block Error Rate
CQI Channel Quality Indicator
FDD Frequency Division Duplex
HS-DSCH High Speed Downlink Shared Channel
HS-PDSCH High Speed Physical Downlink Shared Channel
NACK Negative Acknowledgement
RBS Radio Base Station
TB Transport Block
TBS Transport Block Size
TFRC Transport Format Resource Combination
WCDMA Wideband Code Division Multiple Access

BRIEF DESCRIPTION OF THE DRAWINGS

In the following the invention will be described in more detail, with reference to the appended drawings, in which.

DETAILED DESCRIPTION

Figure 1:
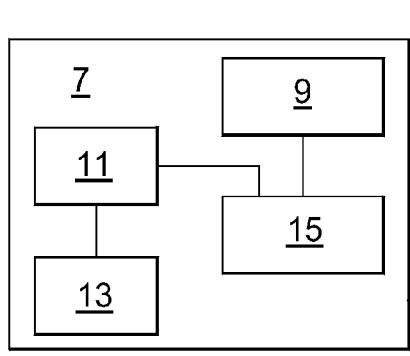
FIG. 1 illustrates a wireless communications network in which the invention may be implemented.
Figure 1:
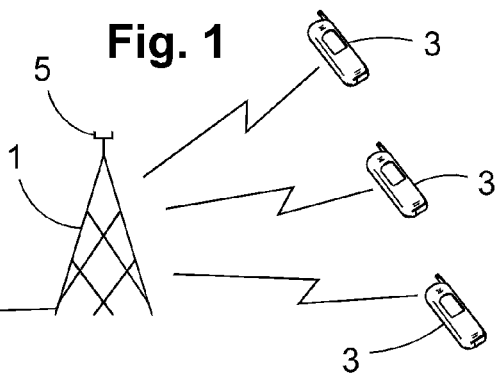

FIG. 1 illustrates a radio base station 1 arranged for wireless communication with a number of mobile terminals 3. The radio base station is typically part of a wireless communications network; for clarity, only one base station is shown.

The radio base station 1 comprises the necessary software and hardware to perform transmission, here represented by an antenna 5 and a control unit 7 arranged to perform control functions for the radio base station 3 as is known in the art. Here, only the control functions that are relevant for the invention will be discussed. The control functions include a scheduling function 9, for scheduling user terminals that are to receive a transport block to be transmitted in an upcoming subframe. There is also a power allocation function 11, for allocating the power available in the subframe to the user terminal or user terminals that are to receive transport blocks.

The scheduling function is performed as is common in the art. The CQI is used, among other things, to determine a TFRC, including a TBS, a modulation method, a set of HS-PDSCH codes and the required transmission power to be used in order to achieve a certain target BLER for the transmission.

Typically there is also a CQI adjustment function 13 for performing CQI adjustment if the CQI reported from a particular terminal does not match the actual situation. As is common in the art, the CQI adjustment is performed on the basis of ACK/NACK signals received from each terminal 3.

According to an aspect of the invention the CQI adjustment function 13, in addition to the conventional function of such a unit, is arranged to compensate for correcting the BLER values if extra power is allocated to one or more user terminals. This correction function will be discussed in more detail in connection with FIGS. 3-5.

According to an aspect of the invention a correction function 15 is arranged for optimizing the power allocation for each transport block. In summary, this is achieved by determining, when the scheduling of a subframe has been completed, whether or not all the available power in the subframe has been allocated. If not, the excess power can be allocated to one or more of the user terminals scheduled for the subframe. The procedure for doing this will be discussed in connection with FIG. 2.

As will be understood, all of the control functions performed by the control unit are implemented as one or more computer programs stored in one or more memory units, to be run on one or more processing units (not shown). The functions may be implemented in separate logical units or may be grouped together as is seen fit. Hence, the division into units made in FIG. 1 is merely for the sake of clarity.

Figure 2:
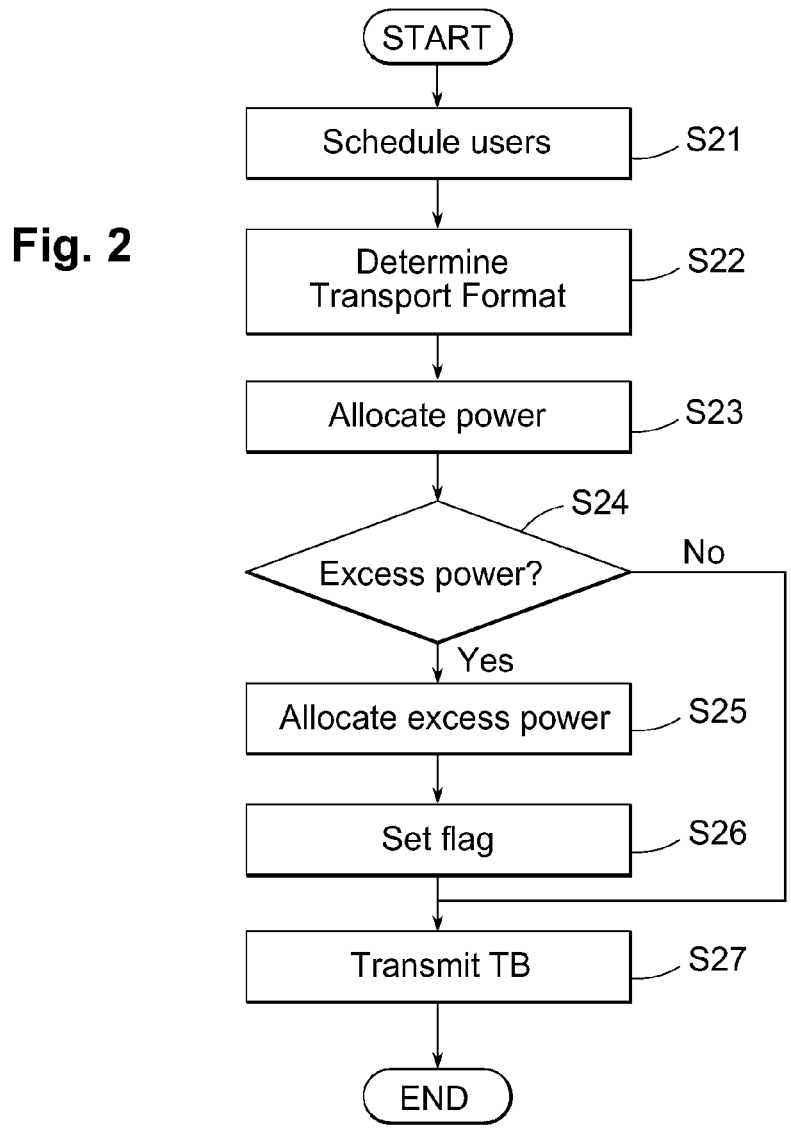
FIG. 2 is a flow chart of a method for allocating power according to an embodiment of the invention.

FIG. 2 is a flow chart of the method of allocating excess power according to a preferred embodiment of the invention.

In step S21 at least one user terminal is scheduled in the subframe.

In step S22 the TFRC is determined as is well known in the art.

In step S23 power is allocated to each of the scheduled user terminals in a manner known in the art.

In step S24 it is determined whether there is excess power available for the transport block after the power allocation. If yes, go to step S25; if no, go to step S27. In step S25 the excess power is allocated to one or more of the scheduled user terminals. The excess power allocation may be determined in a number of different ways, as will be discussed below.

In step S26 a flag is set for the transport block if excess power has been assigned. This flag is needed to enable the calculation of two different BLER values, as will be discussed below.

In step S27 the transport blocks are transmitted to the scheduled user terminals.

Steps S24-S26 are performed for each of the user terminals scheduled in the subframe.

The user terminals in the subframe that are to get excess power, and the extra power to be allocated to each of them may be determined in a number of different ways including but not limited to scheduling priority, that is, allocate excess power according to the scheduling order: first to the first scheduled user terminal, then to the second scheduled user terminal, etc.

experienced BLER, for example, allocate excess power first to the scheduled user terminal having the highest experienced BLER.

fairness, that is, divide the excess power equally to the users scheduled for this subframe.

An additional decision step, not shown in FIG. 2, may be included in the case where there is excess power, to determine if the excess power should be allocated or not. This may be done according to several different criteria.

A minimum amount of excess power that must be available for the transport block may be set in order for extra power to be allocated to any user terminal. This minimum amount may be set according to any of the following, but is not limited to.

in absolute measures (a certain number of watts),
relative to the total power available in the subframe,
relative to the power already allocated to the user terminal or
relative to the amount of excess power available after scheduling A maximum amount of extra power that may be allocated for a transport block may be set according to any of the following, but is not limited to.

in absolute measures (a certain number of watts),
relative to the total power available in the subframe,
relative to the power already allocated to the user terminal or
relative to the amount of excess power available after scheduling The excess power may also be allocated by setting a lower target BLER than the default target BLER for a particular user terminal. The excess power may also be allocated in dependence of the selected TFRC, that is, the selected TBS, the transmission power, the number of HS-PDSCH codes and the modulation method.

Of course, the above methods of allocating the excess power may be combined in various ways. For example, excess power may be allocated according to scheduling priority only if the excess power exceeds a certain minimum value.

In one embodiment the excess power is allocated only to scheduled user terminals for which the selected TBS is either the largest possible for the available number of HS-PDSCH codes and modulation or the largest possible supported by the user equipment category in combination with the network. In this document, this will be used as a definition of the "maximum TBS". As discussed above, transport blocks for which excess power has been allocated will result in an experienced BLER that does not match the target BLER and ACK/NACKs corresponding to such transport blocks cannot be used by the CQI adjustment function to adjust the CQI. Therefore, a better way to handle the excess power may be to ensure first that as much of the available power as possible is allocated in the initial scheduling, to minimize the number of transport blocks for which excess power is allocated to user terminals and thereby minimizing CQI adjustment function disturbance.

To achieve the best possible improvement of the allocation of power according to the above, it is important that a correct value of BLER is used to adjust the CQI. According to an embodiment, therefore, the value of BLER is corrected to reflect only, or predominantly, the BLER for the transport blocks for which no excess power has been allocated. Preferably, two BLER values are calculated: an experienced BLER value, based on ACK/NACK from all transport blocks and corresponding to the block error rate actually experienced by the user terminal, regardless of whether excess power has been allocated or not a filtered BLER value, based on only, or predominantly, ACK/NACK from transport blocks to which no excess power was allocated. As mentioned above, this may be achieved by using different weights for the different blocks when calculating the filtered BLER.

Figure 3:
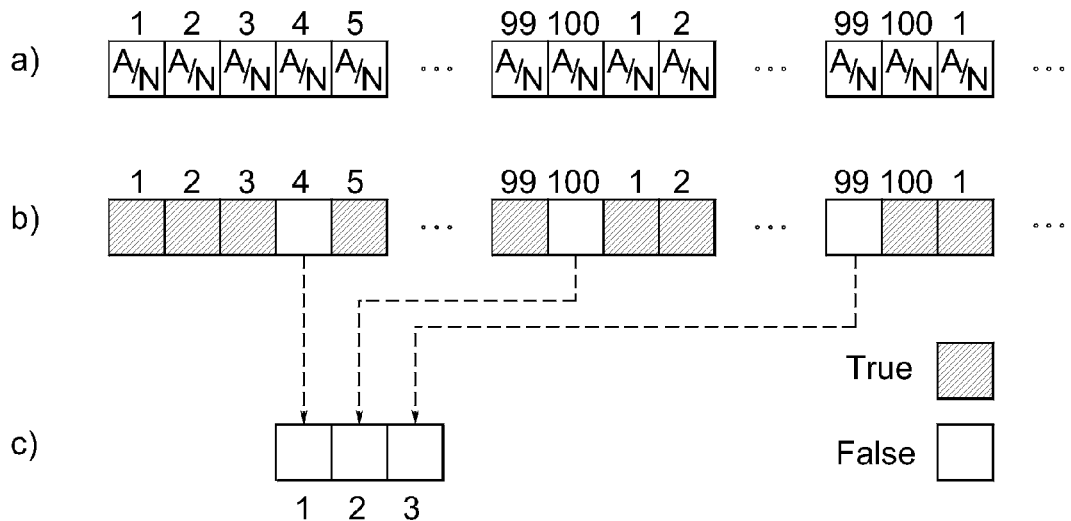
FIG. 3 illustrates the determination of BLER according to an embodiment of the invention.

FIG. 3 illustrates the selection of ACKs/NACKs for producing the experienced BLER value and the filtered BLER value. In 3 a) ACKs/NACKs for a number of transport blocks are received. The ACKs/NACKs are numbered 1, 2, 3, etc. up to 100 and then start again from 1. In 3 b) a flag has been set for the ACKs/NACKs related to transport blocks in which excess power has been assigned. These blocks are shown as shaded in FIG. 3 b). In FIG. 3 c) only the ones for which the flag has not been set, that is, the ACKs/NACKs related to transport blocks in which no excess power was assigned, have been selected. These blocks are renumbered and when a certain number of such blocks, for example 100 blocks, have been collected they are used to evaluate the filtered BLER.

Figure 4:
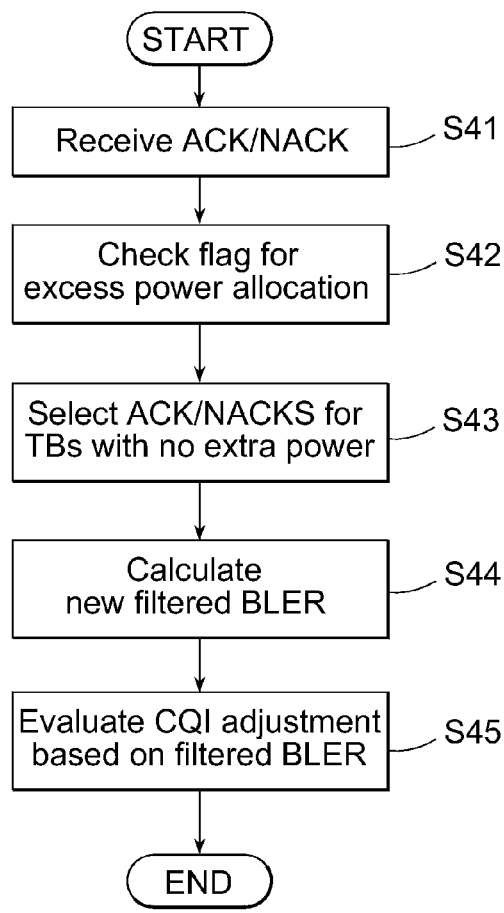
FIG. 4 is a flow chart of a method for CQI adjustment according to an embodiment of the invention.

FIG. 4 is a flow chart of a CQI adjustment method adapted in view of the method of FIG. 2.

In step S41 an ACK/NACK is received for a transport block.

In step S42 it is checked whether a flag has been set for the transport block indicating that excess power has been assigned to the transport block.

Steps S41 and S42 are performed each time an ACK/NACK is received.

In step S43 only the ACKs/NACKs received related to transport blocks in which no excess power has been assigned are selected, and the others are discarded. When a sufficient number of ACKs/NACKs have been selected in step S43, a new value for the filtered BLER is calculated in step S44, that is, the block error rate based only on the ACKs/NACKs selected in step S43.

In step S45 the CQI adjustment is evaluated based on the filtered BLER determined in step S44. CQI adjustment is then performed as is well known in the art. The procedure then starts again at step S41.

Figure 5:
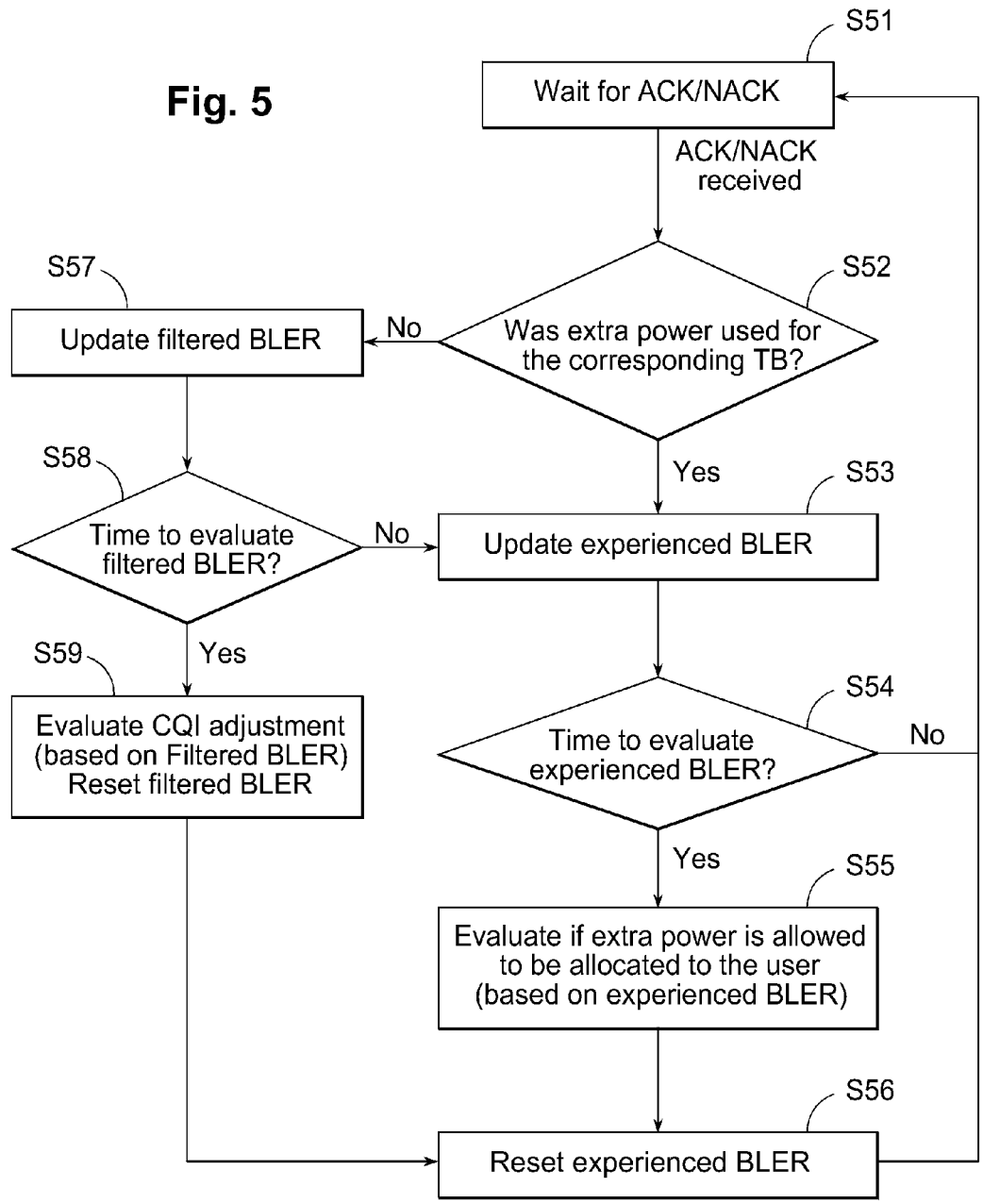
FIG. 5 is a flow chart of the tracking of the BLER according to an embodiment of the invention.

FIG. 5 is a more detailed flow chart of the tracking of the block error rate in accordance with one embodiment of the invention.

In step S51 the CQI adjustment function waits for an ACK/NACK. When an ACK/NACK is received, in step S52 the CQI adjustment function decides whether or not extra power was used for the transport block to which the ACK/NACK relates. If yes, go to step S53; if no, go to step S57.

In step S53 a new value for the experienced BLER is calculated. This is the block error rate actually experienced by the receiver, based on all transport blocks.

In step S54 the CQI adjustment function decides if it is time to evaluate the experienced BLER. This is typically done after a number of transport blocks, for example 100, but may also be performed according to other criteria.

In step S55 based on the value of the experienced BLER, it is evaluated whether or not extra power may be allocated to the user terminal.

In step S56 the experienced BLER is reset and the procedure returns to step S51.

In step S57, if no extra power was used for the transport block, the ACK/NACK related to the transport block may be used when calculating a new value for the filtered BLER.

In step S58 CQI adjustment function decides if it is time to evaluate the filtered BLER. This is typically done after a number of transport blocks that have not had extra power allocated to them, for example 100, but may also be performed according to other criteria.

In step S59 the CQI adjustment is evaluated and possibly changed, based on the new value of the filtered BLER. The filtered BLER value is then reset. Go to step S56.

Typically counters of ACKs/NACKs is used to determine when evaluation should be performed in steps S54 and S58. In this case, the respective counter is reset when the corresponding BLER value is reset.

The invention claimed is:

1. A communications unit for use in a wireless communication system, said communications unit comprising
    a scheduling unit arranged to schedule at least one user terminal to which to transmit in each subframe;
    a power allocation unit arranged to allocate a first amount of power to be used for transmission to the at least one user terminal in each subframe;
    a power optimizing unit arranged to determine, after scheduling has been performed for a chosen subframe, if there is excess power in the chosen subframe that has not been allocated to any user terminal and if so allocate at least a first part of the excess power to at least one user terminal scheduled in the subframe; and
    a Channel Quality Indicator (CQI) adjustment unit for adjusting the CQI reported from the at least first user terminal in dependence of ACK/NACK signals received from the at least first user terminal, wherein the CQI adjustment unit is arranged to adjust CQI taking into account ACK/NACK signals related to transport blocks in which no excess power was allocated to the at least first user terminal to a higher degree than ACK/NACK signals related to transport blocks in which excess power was allocated to the at least first user terminal.

2. A communications unit according to claim 1, further comprising a transmitter arranged to transmit a transport block in a subframe to a number of user terminals in the wireless communication system in accordance with said scheduling and power allocation, said transmitter being arranged to transmit the transport block using the first amount of power and the at least first part of the excess power.

3. A communications unit according to claim 1, wherein the scheduling unit is further arranged to determine a transport block size for use in the subframe and wherein the correction unit is arranged, if excess power is available, to determine if the maximum transport block size is used for the subframe and to allocate excess power only if the maximum transport block size is used, the maximum transport block size being defined as the one for which the selected TBS is either the largest possible for the available number of HS-PDSCH codes and modulation or the largest possible supported by the user equipment category of the user terminal.

4. A communications unit according to claim 1, wherein the correction unit is arranged to allocate the at least first part of the excess power in dependence of a scheduling order set by the scheduling unit.

5. A communications unit according to claim 1, wherein the correction unit is arranged to limit the excess power allocated to the at least first user terminal in dependence of the first amount of power allocated to the at least first user terminal.

6. A communications unit according to claim 1, wherein the correction unit is arranged to determine whether excess power should be allocated to the at least one user based on an experienced block error rate for the at least one user.

7. A communications unit according to claim 1, wherein the CQI adjustment unit is arranged to evaluate an experienced block error rate based on all ACK/NACK signals from the at least first user terminal and a filtered block error rate based on ACK/NACK signals taking into account transport blocks in which no excess power was allocated to the at least first user terminal to a higher degree than ACK/NACK signals related to transport blocks in which excess power was allocated to the at least first user terminal.

8. A wireless communications network characterized that it comprises at least one communications unit 1 according to claim 1.

9. A method in a wireless communication system, in which information is transmitted to a number of user terminals in subframes, the method comprising:
    scheduling at least one user terminal to which to transmit in a chosen subframe;
    allocating a first amount of power to the at least one user terminal;
    determining whether there is excess power in the subframe after scheduling;
    if there is excess power, allocating at least a first part of the excess power to at least one user terminal scheduled in the subframe; and
    performing CQI adjustment of a CQI received from the at least first user terminal in dependence of ACK/NACK signals received from the at least first user terminal, wherein the CQI adjustment will be performed taking into account ACK/NACK signals related to transport blocks in which no excess power was allocated to the at least first user terminal to a higher degree than ACK/NACK signals related to transport blocks in which excess power was allocated to the at least first user terminal.

10. A method according to claim 9, comprising the step of determining whether or not excess power should be allocated to the at least one user based on an experienced block error rate for the at least one user.

11. A method according to claim 9, further comprising transmitting in the subframe using the first amount of power and the at least first part of the excess power.

12. A method according to claim 11, further comprising the step of determining a transport block size for use in the subframe and, if excess power is available, determining if the maximum transport block size is used for the subframe and allocating the excess power only if the maximum transport block size is used, the maximum transport block size being defined as the one for which the selected TBS is either the largest possible for the available number of HS-PDSCH codes and modulation or the largest possible supported by the user equipment category of the user terminal.

13. A method according to claim 9, comprising the steps of scheduling at least two user terminals in a given scheduling order and of allocating excess power to the at least two user terminals in dependence of the scheduling order.

14. A method according to claim 9, wherein the excess power allocated to the at least first user terminal is limited in dependence of the first amount of power allocated to the at least first user terminal.

15. A method according to claim 9, comprising the step of evaluating an experienced block error rate based on all ACK/NACK signals from the at least first user terminal and a filtered block error rate taking into account ACK/NACK signals related to transport blocks in which no excess power was allocated to the at least first user terminal to a higher degree than ACK/NACK signals related to transport blocks in which excess power was allocated to the at least first user terminal.

16. A computer program product for controlling a radio base station in a wireless communications network, said computer program product comprising a non-transitory computer readable medium having thereon computer readable code means, which, when run in a processor will cause the radio base station to:
- schedule at least one user terminal to which to transmit in a chosen subframe;
- allocate a first amount of power to the at least one user terminal;
- determine whether there is excess power in the subframe after scheduling;
- if there is excess power, allocate at least a first part of the excess power to at least one user terminal scheduled in the subframe; and
- perform CQI adjustment of a CQI received from the at least first user terminal in dependence of ACK/NACK signals received from the at least first user terminal, wherein the CQI adjustment will be performed taking into account ACK/NACK signals related to transport blocks in which no excess power was allocated to the at least first user terminal to a higher degree than ACK/NACK signals related to transport blocks in which excess power was allocated to the at least first user terminal.

\* \* \* \* \*

UNITED STATES PATENT AND TRADEMARK OFFICE
CERTIFICATE OF CORRECTION

PATENT NO. : 8,891,463 B2  
APPLICATION NO. : 13/130487  
DATED : November 18, 2014  
INVENTOR(S) : Axelsson et al.

Page 1 of 1

It is certified that error appears in the above-identified patent and that said Letters Patent is hereby corrected as shown below:

On the title page item 57, under "ABSTRACT", in Column 2, Line 10,
delete "unit (5)" and insert -- unit (15) --, therefor.

Signed and Sealed this
Twenty-second Day of March, 2016

Michelle K. Lee
*Director of the United States Patent and Trademark Office*